United States Patent
Horiuchi et al.

Patent Number: 5,918,886
Date of Patent: Jul. 6, 1999

[54] KEYLESS DRILL CHUCK

[75] Inventors: Kengo Horiuchi; Masayuki Sato, both of Koga, Japan

[73] Assignee: Kengo Horiuchi, Koga, Japan

[21] Appl. No.: 08/917,850

[22] Filed: Aug. 27, 1997

[30] Foreign Application Priority Data

Aug. 27, 1996 [JP] Japan ................................ 8-262243
Jun. 30, 1997 [JP] Japan ................................ 9-189244

[51] Int. Cl.$^6$ ............................................. B23B 5/22
[52] U.S. Cl. ......................... 279/58; 279/60; 279/902; 408/226
[58] Field of Search ................... 279/55, 58, 59, 279/60, 64, 156, 902; 408/193, 226

[56] References Cited

U.S. PATENT DOCUMENTS

| | | | |
|---|---|---|---|
| 4,527,809 | 7/1985 | Umbert | 279/60 |
| 4,695,065 | 9/1987 | Komatsu et al. | 279/64 |
| 4,848,779 | 7/1989 | Wheeler et al. | 279/60 |
| 5,685,549 | 11/1997 | Yang | 279/60 |

FOREIGN PATENT DOCUMENTS 50-99585  8/1975  Japan.
3-29056   6/1991  Japan.

Primary Examiner—Andrea L. Pitts
Assistant Examiner—Monica Smith
Attorney, Agent, or Firm—Foley & Lardner

[57] ABSTRACT

A keyless drill chuck includes a raising-and-lowering member which moves back and forth with reference to a shaft in order to secure a rear portion of the cutting tool, and jaws which grip the cutting tool in association with the movement of the raising-and-lowering member toward the jaws while the internal diameter of a circle defined by the jaws. The rear portion of the cutting tool is automatically gripped without the use of a chuck handle by means of a machining resistance transmitted to the jaws from the cutting tool and of the movement of the raising-and-lowering member caused by torsional torque transmitted to a shaft. A V-shaped recess is formed in the end of the raising-and-lowering member facing the jaws, so that the rear portion of the cutting tool can be removable, yet attached to the V-shaped recess.

21 Claims, 6 Drawing Sheets

KEYLESS DRILL CHUCK

BACKGROUND OF THE INVENTION

1. Field of the Invention

The present invention relates to a keyless drill chuck.

2. Description of the Prior Art

A common keyless drill chuck holds a cutting tool, such as a drill or a tap by manually fastening the chuck. The ability of the chuck to grip the cutting tool is determined by a frictional force exerted between the jaws of the chuck and the cutting tool. If the cutting tool slips between the jaws, the chuck needs to be fastened more tightly, or the machining resistance is reduced by reducing the quantity of the cut.

Japanese Utility Model Application Laid-open No. Sho-50-99585 (Prior Art 1) discloses a mechanism to prevent the free-turning of a drill in the drill chuck. Inside this known mechanism, a wedge-shaped recess is formed in the front end surface of the chuck arbor, and the end of a drill shank is formed so as to match the wedged-shaped recess. The insufficient force of the chuck to grip the drill is compensated by fitting the shank of the drill into the wedge-shaped recess in a butt-joined manner so as to prevent the free turning of the drill.

Japanese Utility Model Application Laid-open No. Hei-3-29056 (Prior Art 2) discloses a drill gripping structure. The drill gripping structure is comprised of a main body that is removable concentrically with reference to a rotary spindle; a jaw-interval control section attached to the front portion of the main body; and a plurality of jaws which are housed in the jaw-interval control section and are positioned adjacent to each other in the circumferential direction of the jaw-interval control section. The outer circumferential surface of the drill shank is gripped by means of jaws in such a way that the axis of the drill is brought in to alignment with the axis of the main body. The drill shank has a circular cross section and has a protuberance formed at the distal end. The protuberance is comprised of a first semicylindrical section and a first rotation transmission plane in alignment with the axis of the shank. An opening is axially fluted in the front end of the main body, and the semicylindrical protuberance is fitted into the fluted opening. This opening has a second rotation transmission plane which is aligned with the rotational axis of the main body and with the first rotational axis of the semicylindrical protuberance and comes into surface-contact with the first rotation transmission plane. Further, the opening has a second semicylindrical section that is formed so as to be opposite to the first semicylindrical protuberance of the shank. In short, a semicylindrical recess is formed in the chuck.

If a cutting tool, such as a drill or a tap, slips between the jaws of the keyless drill chuck for chucking the tool, it may cause: abrasion of the jaws, damage to the jaws, run-out, machining failures, or breakage of a machine, jig or cutting tool. A cutting tool, such as a drill, whose shank is damaged, is apt to cause run-out, and hence it cannot be used in high-precision machining operations.

If the jaws are slightly abraded as a result of slippage between the cutting tool and the jaws, the keyless drill chuck remains usable, but cannot be used for precision machining because of the loss of initial precision of the drill chuck, or a reduction in the gripping force of the jaws will result in a failure in unmanned machines.

For these reasons, the chuck of the keyless drill chuck is fastened more tightly, or the quantity of cut is reduced to thereby decrease the machining resistance of a cutting tool such as a drill. There is a limit to an increase in the gripping force of the chuck. If the chuck is tightened excessively, the chuck will break. In contrast, if the quantity of cut is reduced, it takes longer, which in turn adds to the machining cost. Further, this method cannot be applied to a cutting tool used in heavy-weight machining operations.

With a keyless drill chuck, the gripping force of the jaws depends on the machining resistance. Therefore, if the chuck is manually fastened with a small force at the outset, or if the jaws are abraded, the cutting tool causes slippage, thereby resulting in an insufficient force to grip the cutting tool.

To prevent the foregoing problems, several methods have been contrived; namely, the method described in prior art 1 in which a wedge-shaped recess is formed in the front end surface of the chuck arbor; or the method described in prior art 2 in which a semicylindrical portion is formed in the chuck in order to prevent the slippage of the cutting tool.

In prior art 1, when an attempt is made to grip the shank of a cutting tool with the jaws of the chuck, the cutting tool is pushed toward its front end as a result of forward movement of the jaws of the chuck, associated with the fastening action of the cutting tool, because of the wedge-shaped recess formed in the front end surface of the chuck arbor. However, the chuck arbor does not move forward in conjunction with the forward movement of the chuck arbor, so the rear portion of the cutting tool is likely to depart from the front end surface of the chuck arbor. The smaller the diameter of a cutting tool to be retained, the further forward the jaws of the chuck will move. As a result, the rear portion of the cutting tool gradually becomes difficult to come into contact with the chuck arbor. If the cutting tool experiences physical shock, the shock directly acts on the recess. Since the outer circumference of the recess is not supported at all, the recess becomes fragile.

Prior art 1 is intended to be applied to a common drill chuck but not to a keyless drill chuck in which a through core hole is not formed. In terms of ease of machining, directly forming in the chuck arbor a recess which needs a hardness of HRC 50 or more, results in deterioration of productivity.

In prior art 2, since the gravity center of the chuck, which causes the rear portion of a cutting tool to fit into the semicylindrical recess is offset from the center of the chuck, the cutting tool eccentrically rotates at a high speed. The rear end portion of the cutting tool to be fitted into the semicylindrical recess is machined at right angles. However, a grinder usually has a rounded tip end, and hence it is difficult to grind the semicylindrical recess to its deepest portion at right angles. In order to ensure sufficient contact between the recess and the rear portion of the cutting tool, it is necessary to machine the recess sufficiently deeper than the radius of the rounded portion of the grinder. As a result, there is left only a small contact area, and hence the method disclosed in prior art 2 cannot be applied to a small-diameter drill or a fragile tap. Further, a tap handle cannot be used with a tap shank which has been machined by half.

When the rear portion of the cutting tool is fitted into the semicylindrical recess, the cutting tool is supported by the flat surface formed on one side of the rear portion. The semicylindrical reverse side of the rear portion is not supported, and hence force unevenly acts on the cutting tool, as a result of which the cutting tool is apt to be twisted. In the case of taps, they will be broken. In a case where the rear portion of the cutting tool is set to the semicylindrical recess, if a center drill is inserted into the recess while the jaws of the chuck are widely opened, or if a drill having a radius smaller than the radius of the semicylindrical recess is inserted between the jaws, the overall rear portion of the cutting tool is deeply fitted into the recess. As a result, the cutting tool is retained while the center of the chuck is kept out of alignment with the center of the cutting tool, thereby resulting in run-out or dislodgment of the cutting tool.

SUMMARY OF THE INVENTION

To solve the foregoing drawbacks in the first and second examples of the prior art, according to a first aspect of the present invention, there is provided a keyless drill chuck which secures a rear portion of a cutting tool and automatically grips the cutting tool without using a chuck handle by means of machining resistance transmitted to jaws from the cutting tool and of the movement of a raising-and-lowering member caused by a torsional torque transmitted to a shaft. The keyless drill chuck is characterized by including a V-shaped recess formed in the end of the raising-and-lowering member facing the jaws, so that the rear portion of the cutting tool can be removable, yet attached to the V-shaped recess.

In accordance with a second aspect of the present invention, there is provided a keyless drill chuck including a raising-and-lowering member which moves back and forth with reference to a shaft in order to secure a rear portion of a cutting tool, and jaws which grip the cutting tool in association with the movement of the raising-and-lowering member toward the jaws while the internal diameter of a circle defined by the jaws. In this keyless drill chuck, the rear portion of the cutting tool is automatically gripped without the use of a chuck handle by means of machining resistance transmitted to jaws from the cutting tool and by the movement of the raising-and-lowering member caused by torsional torque transmitted to a shaft. The keyless drill chuck is characterized by including a V-shaped recessed member which is inserted into the raising-and-lowering member in such a way that the V-shaped recess is formed in the end of the raising-and-lowering member facing the jaws, to thereby permit the receipt of the rear portion of the cutting tool to be removed.

Preferably, a whirl-stop is inserted between the raising-and-lowering member and the V-shaped recessed member in order to prevent the rotation of the raising-and-lowering member.

More preferably, the raising-and-lowering member and the V-shaped recessed member are integrally molded.

Most preferably, the contact surface of the raising-and-lowering member that comes into contact with the shaft is formed so as to become larger than the inner diameter of the end face of the shaft in order to prevent the raising-and-lowering member from burrowing into the shaft.

As described above, the rear portion of the cutting tool is meshed with the V-shaped recess of the raising-and-lowering member, which moves in association with the movement of the jaws for gripping cutting tool shanks of varying sizes. As a result, machining resistance can be transmitted to the keyless drill chuck regardless of the magnitude of the manual force needed to fasten the chuck. Further, slippage is prevented between the jaws and the cutting tool, enabling the jaws to firmly grip the cutting tool.

Therefore, the shank of the cutting tool is protected from damage, and the accuracy of the cutting tool is ensured. Further, the keyless drill chuck can effect tapping which has been deemed to be difficult for existing drill chucks to perform.

Since no slippage occurs between the jaws and the cutting tool, the jaws will not be abraded. Therefore, the initial accuracy of the cutting tool can be assured over a long period of time, and the cutting tool can be used for precision machining over a long period of time. The durability of the keyless drill chuck is a remarkable improvement, compared with the durability of existing drill chucks.

Even if machining resistance is greater than the maximum rating of existing jaws, the cutting tool is prevented from slipping and hence can perform heavy-load machining. Accordingly, machining time and costs can be reduced.

The keyless drill chuck is capable of gripping cutting tools of varying sizes from a small-diameter cutting tool to a large-diameter cutting tool. The keyless drill chuck can hold the rear portion of the cutting tool in the V-shaped recessed at all times.

The pitch of a screw thread formed on the raising-and-lowering member can be increased, and therefore the number of rotations required for the keyless drill chuck when opening or closing the jaws is reduced in comparison with that required of existing drill chucks. Consequently, the cutting tool can be easily and quickly exchanged.

In comparison to the method of directly fixing a non-slip member to the chuck arbor or chuck, the construction in which a whirl-stop is attached to the raising-and-lowering member of the keyless drill chuck allows the circumferential portion of the raising-and-lowering member and a thrust ball to absorb the physical shock exerted on the cutting tool. Further, the raising-and-lowering member is prevented from being broken or damaged, so long as the V-shaped grooves are formed from hard material, and the other areas of the circumferential portion outside the V-shaped grooves are formed from soft material.

The keyless drill chuck in the present invention can grip cutting tools in a wide range of sizes. Therefore, the need for an expensive collet chuck capable of holding only a cutting tool of one size is eliminated, rendering the keyless drill chuck more economical.

The present invention provides a high-precision keyless drill chuck which provides a large gripping force to prevent slippage, and high-precision run-out-free gripping force.

BRIEF DESCRIPTION OF THE DRAWINGS

The accompanying drawings incorporated in and forming a part of the specification, illustrate several aspects of the present invention, and together with the description serve to explain the principle of the invention. In the drawings.

Reference will now be made in detail to the present preferred embodiments of the invention, examples of which are illustrated in the accompanying drawings.

DESCRIPTION OF THE PREFERRED EMBODIMENTS

A keyless drill chuck according to one aspect of the present invention will be described.

Figure 3:
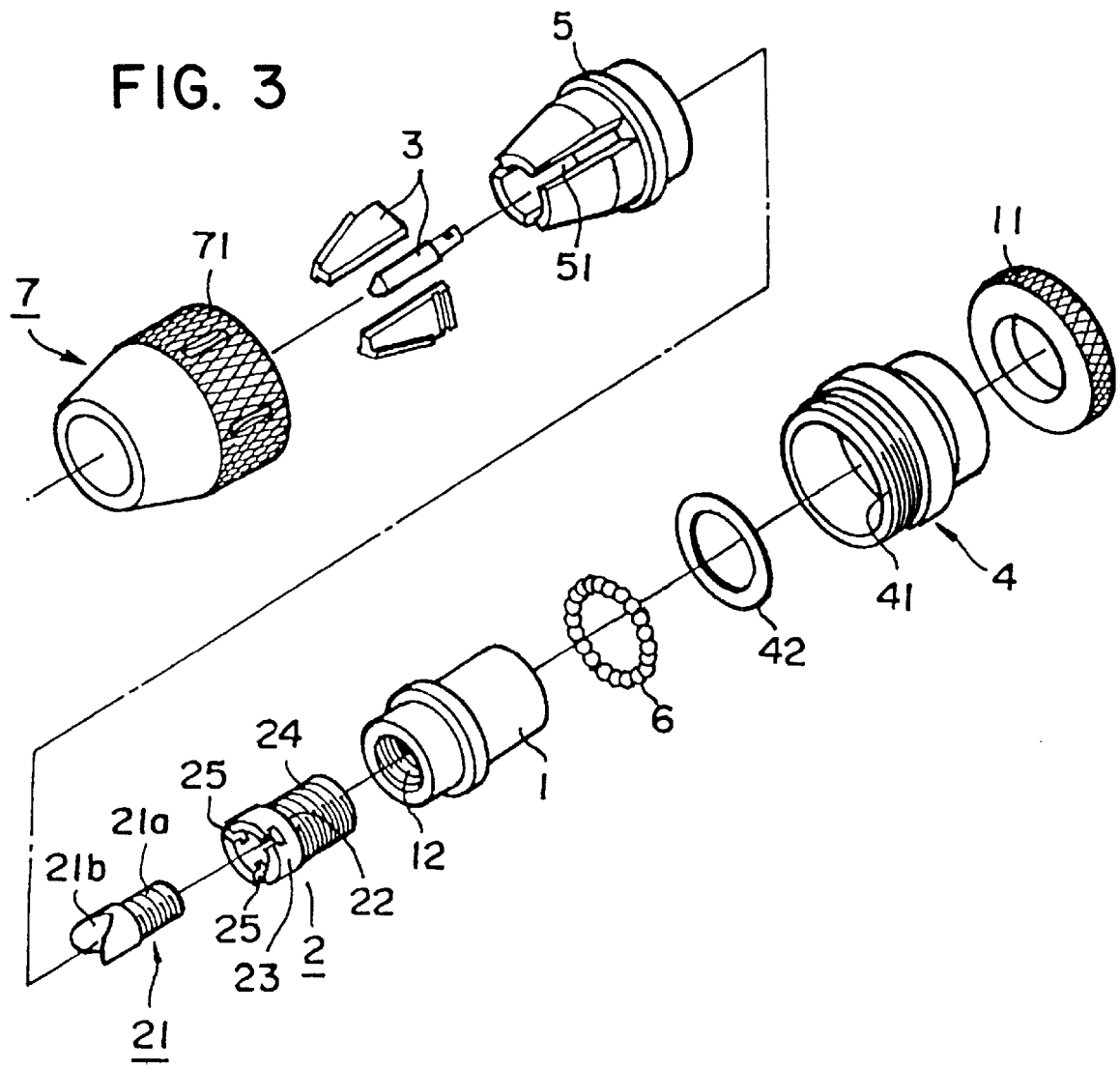
FIG. 3 is an exploded perspective of the keyless drill chuck.
Figure 5:
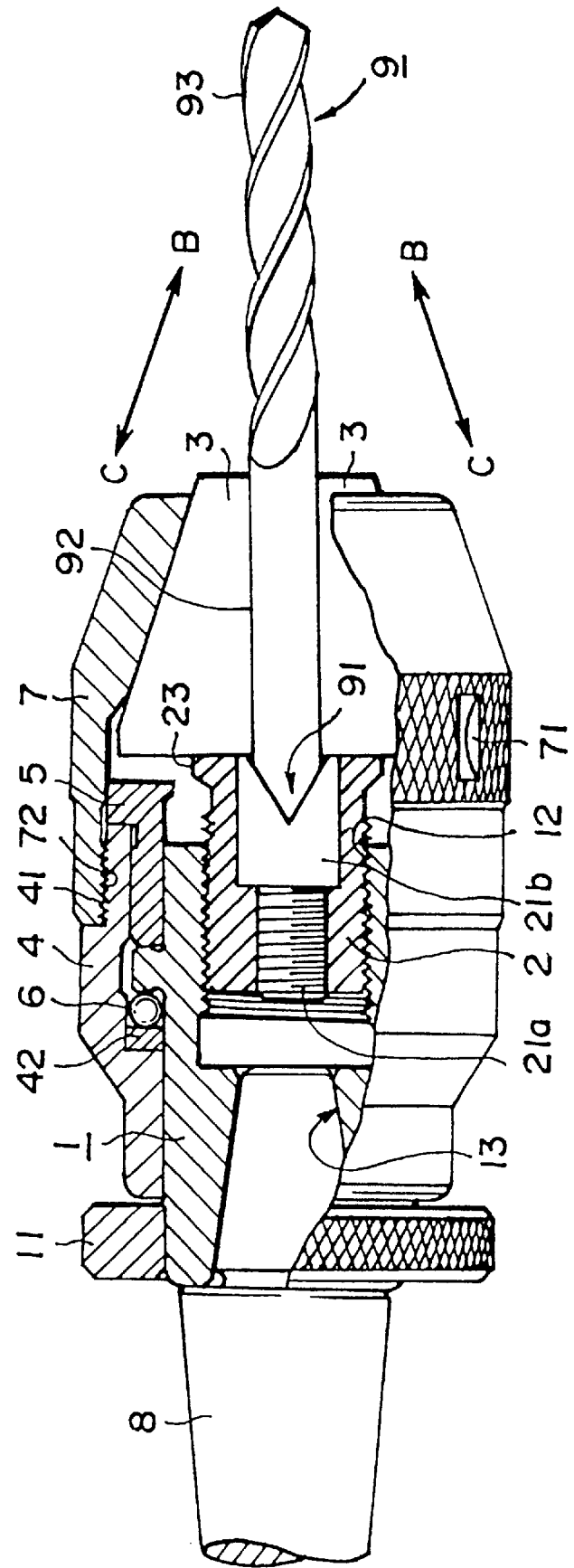
FIG. 5 is a view similar to FIG. 1, but showing a cutting tool which has a comparatively large diameter and is fitted into the keyless drill chuck.

The keyless drill chuck is assembled in the following manner. As shown in FIG. 3, a rotary sleeve 4 is fitted to the rear portion of a shaft 1 with a thrust ball 6 and a thrust bearing ring 42 sandwiched between them. A raising-and-lowering member 2 is screwed into a female screw thread 12 formed on the internal surface of the front portion of the shaft 1. A jaw guide 5 having jaw guide grooves 51 is inserted between the outside of the shaft 1 and the rotary sleeve 4. Next, jaw pieces 3 are each attached to T-shaped recess 25 of the raising-and-lowering member 2 so as to be longitudinally movable along the jaw guide grooves 51. Finally, a male screw thread 41 formed on the outer surface of the rotary sleeve 4 is screwed into a female screw thread 72 formed on the internal surface of a tapered ring 7, whereby the keyless drill chuck is assembled. A main shaft or chuck arbor 8 of a machine tool is fitted into a receiving section 13 formed in the shaft 1 of the keyless drill chuck. As shown in FIG. 5, to attach a cutting tool 9 to the drill chuck, a grip ring 11 and a tapered ring 7 are rotated in opposite directions, so that the interval between the jaws 3 in the circumferential direction thereof is increased. The cutting tool 9 is then inserted into the jaws 3, and the tapered ring 7 is rotated in the reverse direction, thereby fixedly gripping the cutting tool 9 is fixedly gripped.

Figure 1:
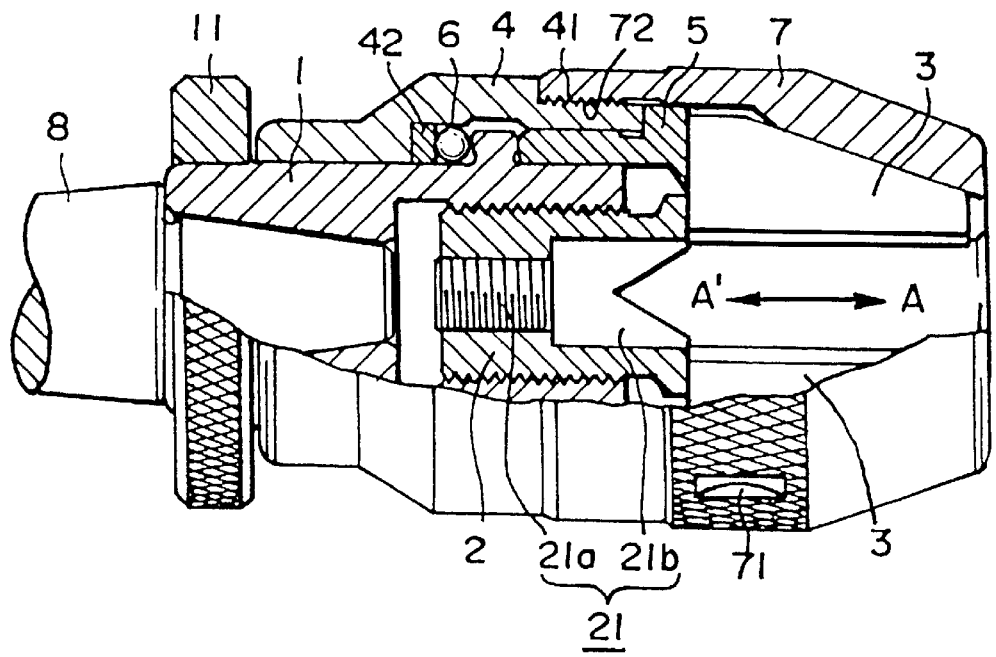
FIG. 1 is a partial cutaway cross-sectional side view showing a keyless drill chuck according to one embodiment of the present invention.
Figure 2:
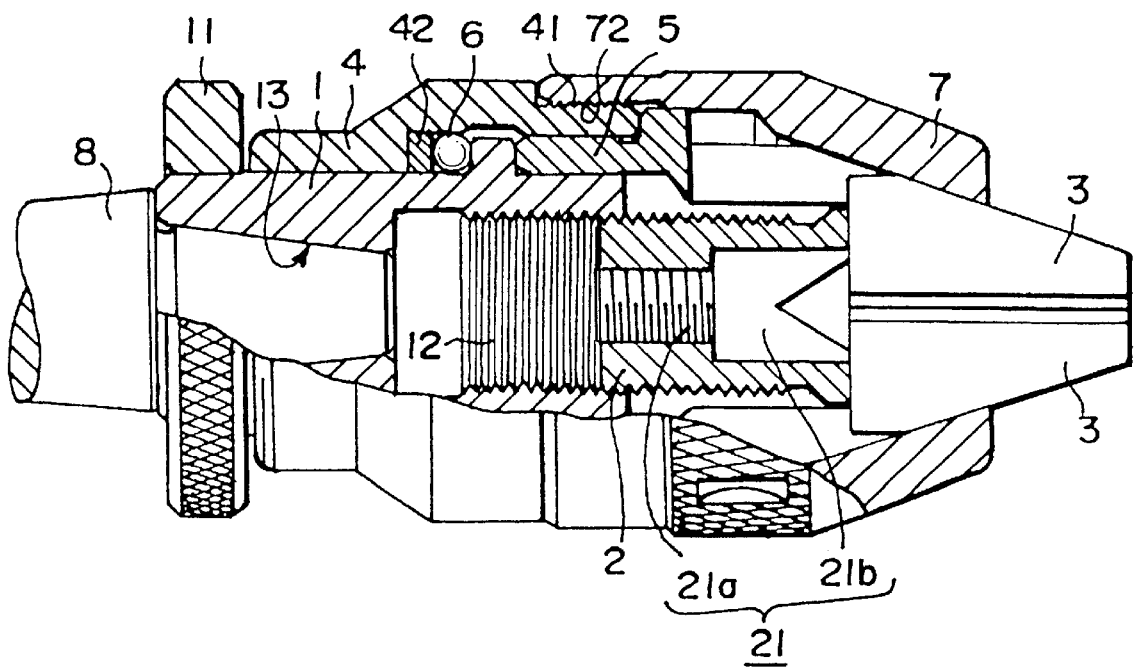
FIG. 2 is a view similar to FIG. 1, but showing a raising-and-lowering member and a V-shaped recessed member which are positioned in the vicinity of the jaw-opening position.
Figure 6:
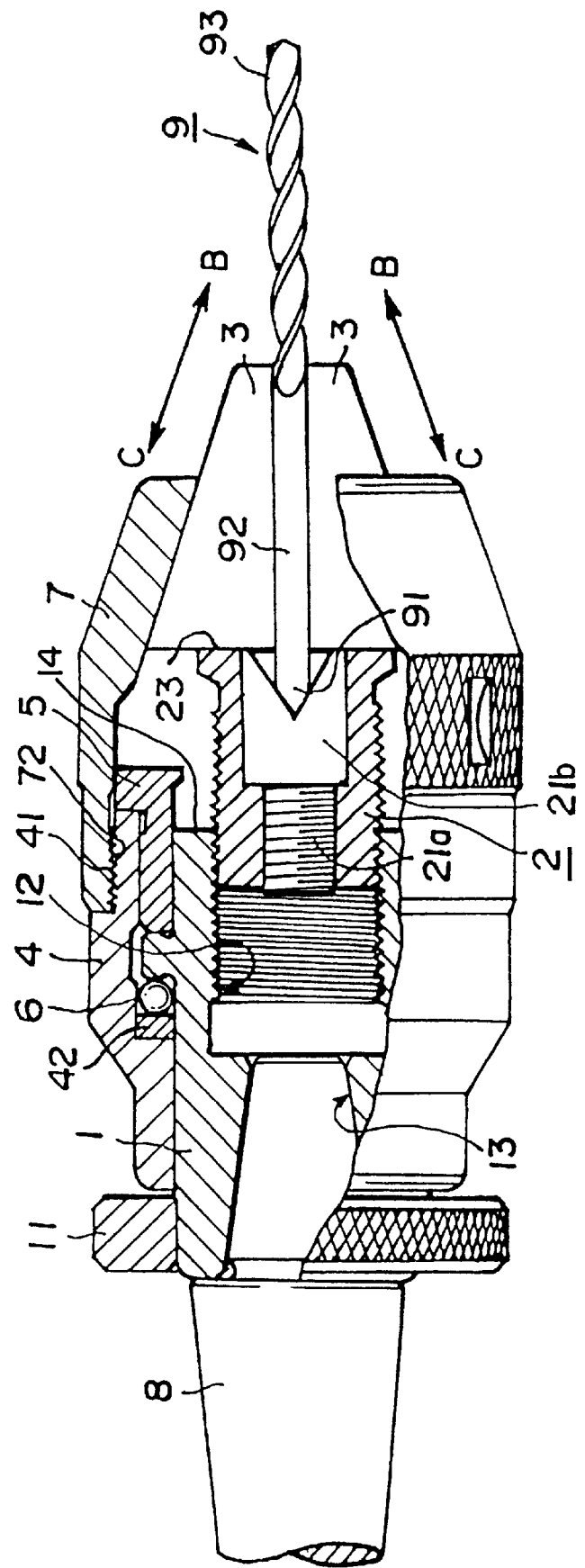
FIG. 6 is a view similar to FIG. 5, but showing a cutting tool which has a comparatively smaller diameter and is fitted into the keyless drill chuck.

As shown in FIG. 3, the three jaw piece guide grooves 51 are formed along the circumference of the jaw guide 5 at even intervals, and the jaw piece 3 is provided so as to be longitudinally movable along each jaw piece guide recess 51. The rear end of each jaw piece 3 is fitted into the T-shaped recess 25 formed in a jaw piece mount 23 of the raising-and-lowering member 2. As a result of the rotation of the tapered ring 7, the raising-and-lowering member 2 rotatingly moves back and forth with reference to the shaft 1. The jaw pieces 3 attached to the raising-and-lowering member 3 are also moved back and forth. As shown in FIGS. 1 and 2, the jaw pieces 3 are movable back and forth in association with the movement of the raising-and-lowering member 2 (in the direction designated by arrows A—A') while the internal diameter of the jaw is changed. In short, as shown in FIG. 6, when the jaw pieces 3 are moved forward (i.e., in the direction designated by arrow B), the internal diameter of a circle defined by the three jaw pieces 3 is reduced, so that the keyless drill chuck can grip a small-diameter cutting tool 9. In contrast, as shown in FIG. 5, when the jaw pieces 3 are moved backwards (i.e., in the direction designated by arrow C), the internal diameter is increased, so that the keyless drill chuck can grip a large-diameter cutting tool 9. Movement of the jaw pieces 3 associated with the movement of the raising-and-lowering member 2 and the V-shaped recessed member 21 allows gripping of cutting tools 9 of varying thickness to the gripped.

Figure 4:
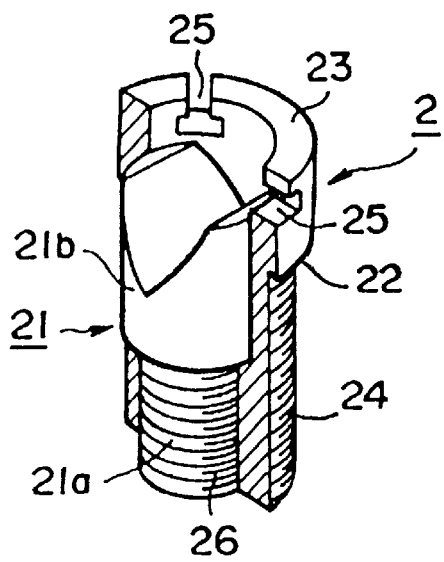
FIG. 4 is a partially cutaway view of the raising-and-lowering member, showing the V-shaped recessed member.

As shown in FIG. 4, the raising-and-lowering member 2 is made of a cylindrical material, and the male screw thread 24 is formed on the outer surface of the cylindrical material. The jaw piece mount 23 is formed on the end of the cylindrical material facing the rear portion of the cutting tool. In the embodiment shown in FIGS. 1 through 6, a female screw thread 26 is formed on part of the internal surface of the cylindrical material close to the shaft 1, so that the remaining part of the internal surface is larger in diameter than the part of the internal surface having the female screw thread 26 formed thereon. The three T-shaped recesses 25 are formed in the circumference of the claw piece mount 23 of the raising-and-lowering member 2 at even intervals. The rear portion of each claw piece 3 is fitted into each T-shaped recess 25. If the diameter of the male screw thread 24 of the raising-and-lowering member 2 is increased, the male screw thread 24 may tightly mesh with the female screw thread 12 of the shaft 1, and they may be difficult to loosen. To prevent such a problem, the pitch of the male screw thread 24 is reduced, or the surface of the male screw thread 24 is smoothed.

The V-shaped recessed member 21 is firmly inserted into the female screw thread 26 of the raising-and-lowering member 2, so that the V-shaped recess faces the jaw of the chuck. The V-shaped recessed member 21 is comprised of a bolt 21a capable of being screwed into the female screw thread 26 of the raising-and-lowering member 2, and a V-shaped recess portion 21b which has an outer diameter larger than that of the bolt 21a and comprises tilt planes. This V-shaped recess portion 21b is comprised of a V-shaped recess which has an angle of tilt of 60 degrees between the planes. Preferably, the bolt 21a of the V-shaped recessed member 21 and the female screw thread 26 of the raising-and-lowering member 2 are welded together after the bolt 21a has been screwed into the female screw thread 26.

The outer diameter of the V-shaped recess portion 21b of the V-shaped recessed member 21 needs to be set so as to become larger than the maximum diameter of the cutting tool 9 which can be fitted into the keyless drill chuck. As a result, the outer diameter of the male screw thread 24 of the raising-and-lowering member 2 is formed so as to become substantially the same as or slightly smaller than the outer diameter of the jaw piece mount 23. The angle defined between the two planes of the V-shaped recess portion 21b is set to the range of 40 through 70 degrees, preferably 60 or 45 degrees.

Figure 7:
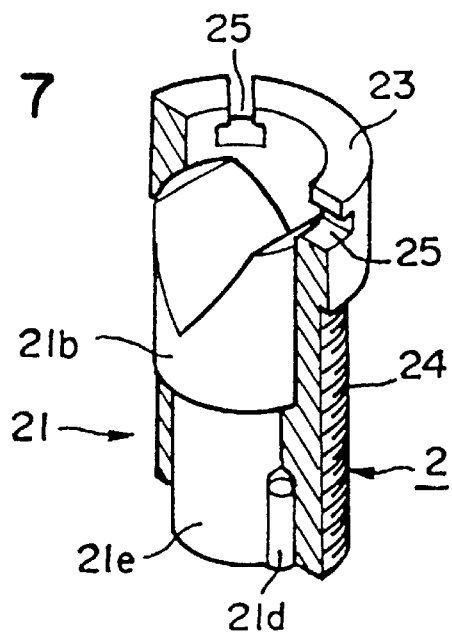
FIG. 7 is a view similar to FIG. 4, but showing a raising-and-lowering member having a whirl-stop member and a V-shaped recessed member according to another embodiment of the present invention.
Figure 8:
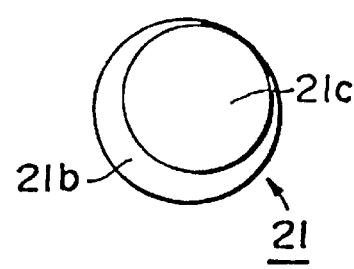
FIG. 8 is an end view of the V-shaped recessed member having an offset receiving section according to another embodiment of the present invention.
Figure 9:
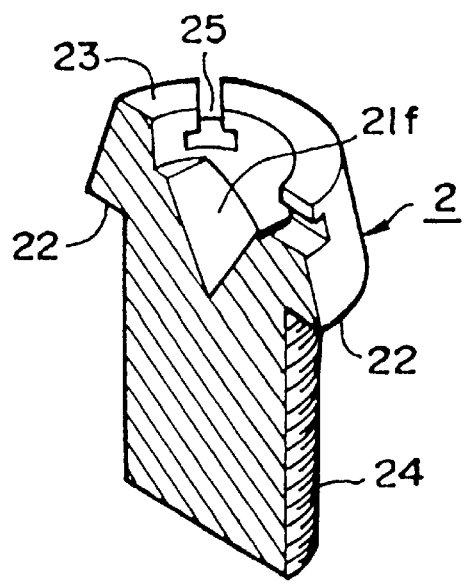
FIG. 9 is a longitudinal cross-sectional view of a raising-and-lowering member formed by integrating together a raising-and-lowering member and a V-shaped recessed member according to another embodiment of the present invention.

FIGS. 7 through 9 show the raising-and-lowering member 2 and the V-shaped recessed member 21 according to another embodiment of the present invention. The raising-and-lowering member 2 shown in FIG. 7 has two internal diameters. A part of the inside of the raising-and-lowering member 2 close to the shaft 1 is formed into a smooth cylinder whose internal diameter is smaller than the remaining part of the inside of the raising-and-lowering member 2. A shaft receiving section 21e is correspondingly formed so as to have a smooth surface and an outer diameter smaller than the outer diameter of the V-shaped recess portion 21b. In this embodiment, after the V-shaped recessed member 21 has been fitted into the raising-and-lowering member 2, a hole is drilled into an arbitrary point within the area where they are in contact with each other. A whirl-stop pin 21d is inserted in the hole in order to stop the V-shaped recessed member 21 from rotating with respect to the raising-and-lowering member 2. Preferably, the raising-and-lowering member 2, the V-shaped recessed member 21, and the whirl-stop member 21d should be welded together. In the embodiment, the raising-and-lowering member 2 and the V-shaped recessed member 21 are in surface contact with each other and are prevented from rotating by the insertion of the whirl-stop member 21d.

FIG. 8 shows the V-shaped recessed member 21 according to another embodiment of the present invention. The cylindrical center of an eccentric insertion 21c is off-centered with reference to the cylindrical center of the V-shaped recess portion 21b. The raising-and-lowering member 2 corresponding to this V-shaped recessed member 21 is formed in such a way that the outer circumferential surface is off-centered from the inner circumferential surface. Therefore, if they are assembled into one piece, they are prevented from rotating. The raising-and-lowering member 2 and the V-shaped recessed member 21 are thus welded together.

Alternatively, although not shown in the drawings, the internal surface of the raising-and-lowering member 2 and the outer surface of the V-shaped recessed member 21 to be inserted into the raising-and-lowering member 2 may be formed into a polygonally cylindrical shape. They may be fixed together by inserting the V-shaped recessed member 21 into the raising-and-lowering member 2.

FIG. 9 shows another embodiment of the raising-and-lowering member 2. The raising-and-lowering member 2 and the V-shaped recessed member are molded into a single piece, and reference numeral 21f designates a V-shaped recess.

The jaw piece mount 23 of the raising-and-lowering member 2 shown in FIG. 9 is formed into a circular truncated cone, whereby the area of contact surface 22 which comes into contact with the shaft 1, is increased so as to become larger than the area of an end surface 14 of the shaft 1 facing the jaw. As a result, the raising-and-lowering member 2 is prevented from burrowing deep into the shaft 1. Even in the previous embodiment in which the raising-and-lowering member 2 and the V-shaped recessed member 21 are formed separately from each other, the contact surface 22 of the raising-and-lowering member 2 may be formed so as to become larger than the end surface 14 of the shaft 1.

Figure 10:
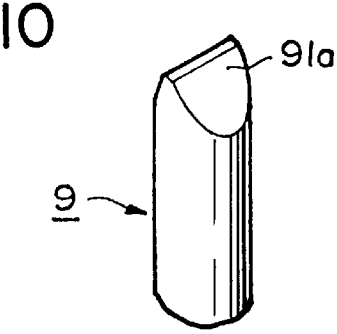
FIG. 10 is a perspective view of the rear portion of a cutting tool.
Figure 13:
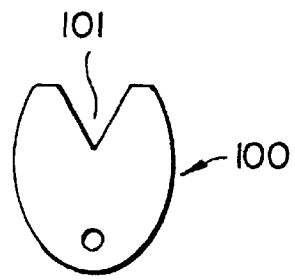
FIG. 13 is a front view of an angle template which is an accessory.

As shown in FIG. 10, a rear portion 91a of the cutting tool 9 is formed into a wedge-shaped tip having an angle of 60 degrees or less. Preferably, an angle template 100 having wedge-shaped recess 101 with an angle of 60 degrees is prepared as an accessory as seen in FIG. 13, so that the rear portion 91a is formed by bringing it into contact with the recess 101.

Figure 11:
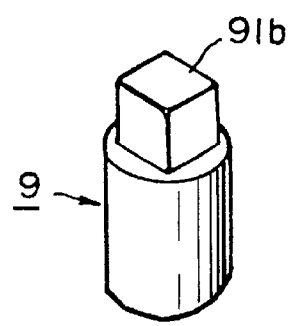
FIG. 11 is a view similar to FIG. 10, but showing the rear portion of a cutting tool having another shape.

As shown in FIG. 11, if the cutting tool 9 is a tap, its rear portion 91b is formed into a square pole. Even in this case, the angular portions of the square pole 91b come into contact with the surfaces of the V-shaped recess. Therefore, this square pole 91b has the same operation and effect as the wedge-shaped rear portion 91a.

The keyless drill chuck having the construction described in the previous embodiments, is attached to an unillustrated machining tool (such as a drilling machine) by way of a chuck arbor. The V-shaped recessed portion 21b of the raising-and-lowering member 2 of the keyless drill chuck is meshed with the wedge-shaped rear portion 91a corresponding to the V-shaped recess 21b. The grip ring 11 and the tapered ring 7 are rotated in opposite directions so as to reduce the internal diameter of the circle defined by the three jaw pieces 3. As a result, a cutting tool shank 92 of the cutting tool 9 is gripped by the jaw. In the case where the cutting tool 9 is a tap, the worker fastens the cutting tool shank 92 prior to machining operation by engaging an unillustrated wrench with wrench slots 71 formed in the tapered ring 7 in order to prevent the loosening of the cutting tool 9 which would otherwise be caused by reverse rotation of the chuck.

The torque of the machining tool is transmitted to the shaft 1 via the chuck arbor 8 and is further transmitted to the cutting tool 9 via the V-shaped recessed portion 21b and the jaw pieces 3 while rotating the raising-and-lowering member 2. At the same time, machining resistance acts on a head screw 93 of the cutting tool 9 so as to prevent rotation of the cutting tool 9. In the case of a keyless drill chuck in which the machining resistance is transformed into the force of the chuck to grip the cutting tool 9, the V-shaped recessed portion 21b meshes with the rear portion 91 of the cutting tool 9, whereby the cutting tool 9 can be prevented from slipping and rotating with reference to the raising-and-lowering member 2. Further, all of the torsional force of the cutting tool 9 can be transmitted to the raising-and-lowering member 2, so that the jaw pieces 3 are further fastened to thereby produce a strong gripping force. At this time, as in the case of a conventional chuck, the jaw pieces 3 retain the center axis of the cutting tool 9 and grip the cutting tool 9 so as to prevent it from rotating. In addition, even if the machining resistance (which is greater than the frictional force of the jaw pieces 3 to grip the cutting tool 9) is exerted on the head screw 93, the V-shaped recessed portion 21b meshes with the rear portion 91, thereby preventing the cutting tool 9 from rotating.

Figure 12:
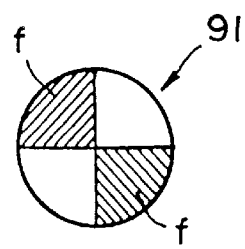
FIG. 12 is a schematic representation showing a force being exerted on the rear end portion of the cutting tool when the cutting tool is rotated while its rear portion is fitted to the V-shaped recess.

As shown in FIG. 12, during the course of the machining operation, the force acts on two hatched areas f, f that are symmetric with respect to the center of the rear portion 91, and hence the force evenly acts on the cutting tool 9, eliminating the risk of breakage of the cutting tool 9.

The foregoing description of the preferred embodiments of the invention has been presented for purposes of illustration and explanation. It is not intended to be exhaustive or to limit the invention to the precise forms disclosed. Obvious modifications or variations are possible in light of the above teachings. The embodiments were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, equitably, and legally entitled.

We claim:

1. A keyless drill chuck for securing a rear portion of a cutting tool and for automatically gripping said cutting tool without use of a chuck handle by a machining resistance transmitted to jaws from said cutting tool and by a movement of a raising-and-lowering member caused by a torsional torque transmitted to a shaft, wherein a V-shaped recess is formed in an end of said raising-and-lowering member facing said jaws, so that said rear portion of said cutting tool is removably attached to said V-shaped recess.

2. A keyless drill chuck, comprising
   a raising-and-lowering member that is moveable back and forth with reference to a shaft to secure a rear portion of a cutting tool,
   a set of jaws adapted to grip said cutting tool in association with a movement of said raising-and-lowering member toward the jaws while an internal diameter of a circle defined by said jaws is reduced as said raising-and lowering member is moved toward said jaws, wherein said rear portion of said cutting tool is automatically defined by said jaws, wherein said rear portion of said cutting tool is automatically gripped by a machining resistance transmitted to said jaws from said cutting tool and of the movement of said raising-and-lowering member caused by a torsional torque transmitted to a shaft, and
   a V-shaped recessed member inserted into said raising-and-lowering member, wherein a rear portion of said cutting tool is removably attached to said V-shaped recess.

3. A keyless drill chuck as claimed in claim 2, further comprising:
   a whirl-stop member inserted between said raising-and-lowering member and said V-shaped recessed member.

4. A keyless drill chuck as claimed in claim 2, wherein said raising-and-lowering member and said V-shaped recessed member are integrally molded into a one-piece construction.

5. A keyless drill chuck as claimed in claim 2, wherein
   a contact surface of said raising-and-lowering members which comes into contact with the shaft, is larger than an inner diameter of an end face of said shaft.

6. A keyless drill chuck, comprising:
   a shaft;
   a rotary sleeve fitted to a rear portion of said shaft;
   a raising-and-lowering member attached to said shaft;
   a jaw guide, having a plurality of jaw guide grooves, mounted between an outside of said shaft and said rotary sleeve;
   a plurality of jaw pieces, each of said jaw pieces being attached to a recess in said raising-and-lowering member, and
   a V-shaped recess member inserted into said raising-and-lowering member adapted to removably attach an end of a cutting tool.

7. A keyless drill chuck as claimed in claim 6, wherein said plurality of jaw guide grooves are formed along a circumference of said jaw guide at even intervals.

8. A keyless drill chuck as claimed in claim 7, wherein each of said jaw pieces are displaceably mounted in a respective one of said plurality of jaw guide grooves.

9. A keyless drill chuck as claimed in claim 6, wherein said plurality of jaw pieces moves in association with a movement of said raising-and-lowering member while an internal diameter defined by said plurality of jaw pieces changes.

10. A keyless drill chuck as claimed in claim 6, further comprising a whirl-stop pin inserted into a hole at an interface of said V-shaped recess member and said raising-and-lowering member.

11. A keyless drill chuck as claimed in claim 10, wherein said whirl-stop pin, said V-shaped recess member, and said raising-and-lowering member are welded together.

12. A keyless drill chuck as claimed in claim 6, wherein a cylindrical center of an eccentric insertion is off-center with respect to a cylindrical center of said V-shaped recess member, and wherein an outer circumferential surface of said raising-and-lowering member is off-center.

13. A keyless drill chuck as claimed in claim 12, wherein said raising-and-lowering member and said V-shaped recess member are welded together.

14. A keyless drill chuck as claimed in claim 6, wherein said V-shaped recess member and said raising-and-lowering member are formed as one-piece.

15. A keyless drill chuck as claimed in claim 14, wherein a jaw-piece mount of said raising-and-lowering member is larger than an end contact surface of said shaft.

16. A keyless drill chuck as claimed in claim 6, wherein a jaw-piece mount of said raising-and-lowering member is larger than an end contact surface of said shaft.

17. A keyless drill chuck as claimed in claim 6, wherein an angle defined by a pair of surfaces of a V-shaped recess portion of said V-shaped recess member is between 40 and 70 degrees.

18. A keyless drill chuck as claimed in claim 6, wherein an angle defined by a pair of surfaces of a V-shaped recess portion of said V-shaped recess member is 60 degrees.

19. A keyless drill chuck as claimed in claim 6, wherein an angle defined by a pair of surfaces of a V-shaped recess portion of said V-shaped recess member is 45 degrees.

20. A keyless drill chuck as claimed in claim 6, wherein a torque is transmitted from said V-shaped recess member to said cutting tool.

21. A machining tool, comprising:
   a keyless drill chuck, having a shaft; a raising-and-lowering member attached to said shaft; a jaw guide having jaw guide grooves mounted to an outside of said shaft; a plurality of jaw pieces, each of said jaw pieces is attached to a recess in said raising-and-lowering member, and a V-shaped recess member inserted into said raising-and-lowering member; and
   a cutting tool displaceably attached to said keyless drill chuck, wherein an end of said cutting tool is meshed with a V-shaped end of said V-shaped recess member.

* * * * *